April 26, 1932.  R. GILLIS ET AL  1,855,855

MOLDING DIE

Filed July 29, 1929

Inventors
Randall Gillis
James C. Morison
By H. A. Latham Att'y.

Patented Apr. 26, 1932

1,855,855

UNITED STATES PATENT OFFICE

RANDALL GILLIS, OF LA GRANGE, AND JAMES C. MORISON, OF BERWYN, ILLINOIS, ASSIGNORS TO WESTERN ELECTRIC COMPANY, INCORPORATED, OF NEW YORK, N. Y., A CORPORATION OF NEW YORK

MOLDING DIE

Application filed July 29, 1929. Serial No. 381,995.

This invention relates to molding dies, and more especially to dies for molding magnetic dust into toroidal cores for induction loading coils used in telephone systems.

Magnetic dust core rings are formed by molding the insulated magnetic dust under high pressure. It is the usual practice in some cases to provide a molding die comprising a plurality of separable segments or forming sections arranged in a conical depression in a holder or base member around a center plug so that the sections and plug provide an annular groove in which the insulated dust is deposited. In the compressing operation the pressure ring is placed over the dust, and a hydraulic press is used to force the ring under high pressure into the annular groove to form the dust into an integral core ring. The applying of high pressure upon the confined magnetic dust causes the die to expand and then to contract when the pressure is released, this action is exaggerated at the ends of the forming sections to such an extent as to cause, in some instances, the formed core part to be subjected to localized stresses of such intensity as to crack it.

The principal object of this invention is to provide a molding die of simple construction for efficiently and economically producing parts without subjecting them to strains and stresses when the forming pressure is relieved.

In accordance with one embodiment, the present invention contemplates the provision of a sectional die for molding toroidal cores of permalloy dust, wherein a clearance is provided between the wall of the die base and the central portion of each forming section of the die to permit an increase in the curvature of the forming die sections in a direction toward the part being molded under pressure whereby upon the release of the pressure the curvature of the forming sections is decreased to avoid cracking of the core part, which might otherwise occur if the curvature of the sections increased to subject the core part to excessive localized stresses at the ends of the sections when the pressure is released.

Figure 1:
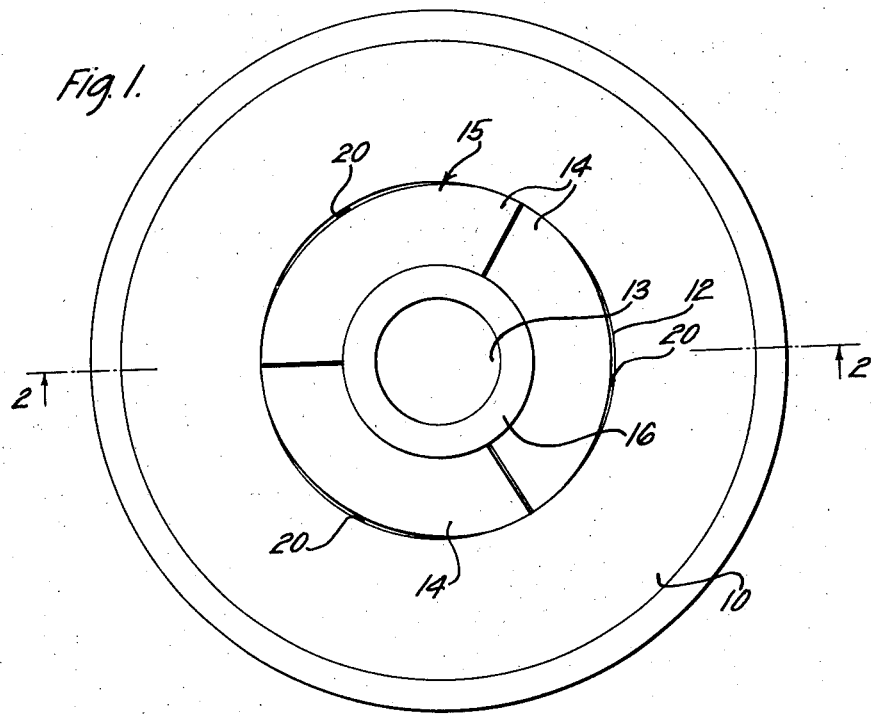
Figure 2:
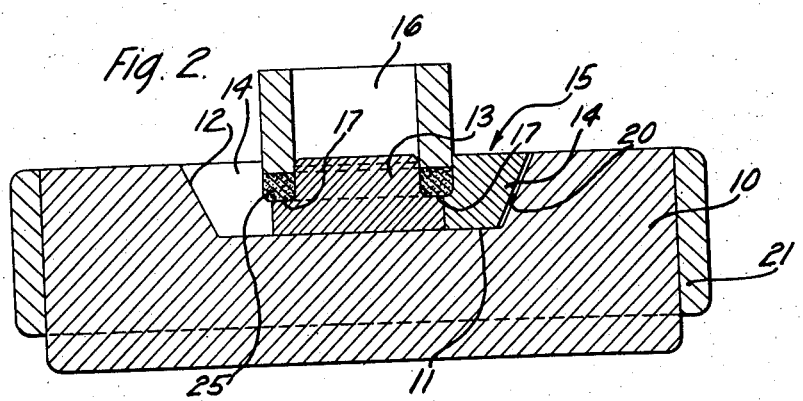

It is believed that the invention will be clearly understood from the following detailed description of one embodiment thereof and the accompanying drawings, in which Fig. 1 is a plan view of a molding die made in accordance with the present invention, and Fig. 2 is a sectional view thereof, taken on line 2—2 of Fig. 1, disclosing the die filled with permalloy dust ready to receive the compressing force to form the dust into a core ring.

It will be understood, however, that this embodiment of the invention is merely illustrative and the invention is not limited to the production of this form of core, but is adapted to the production of cores of many forms.

Referring now to the drawings wherein like numerals designate similar parts throughout the various views, the die base 10, preferably made of a high grade steel, is provided with a circular recess 11, having a tapered wall 12. Seated within this recess are the forming or molding parts of the die comprising a center plug 13, three forming sections 14—14 positioned around the center plug to form a sectional ring 15, and a pressure ring 16 adapted to be inserted into an annular groove 17 provided by the shapes of the cooperating sectional ring and the center plug as clearly shown in Fig. 2.

In order to have the forming sections 14—14 of the ring 15 increase their curvature under pressure and decrease their curvature when the pressure is released to cause the ends of the sections to move away from the core part formed in the groove 17, the tapered wall of each of the forming sections 14 is ground at its central portion to provide a clearance 20 of approximately .008 of an inch between it and the wall 12 of the die base. This clearance is greatest at the middle point in the outside periphery of each forming section 14 and gradually decreases to a zero value a short distance from each of the ends of the forming sections, so that the tapered wall of each of the forming sections contacts with the tapered wall 12 of the die base only at the portions adjacent the ends of the forming sections. Since the die base is subjected to high compressing forces a steel band 21 is forced therearound to protect the operator against fragments thereof in case the base should crack under pressure.

When employing the above described die in molding or forming permalloy dust rings under pressure, a mass of insulated permalloy dust 25 is placed in the annular groove 17 and the pressure ring 16 is placed thereon as illustrated in Fig. 2. The pressure ring is then forced down on the dust within the groove 17 with a pressure of approximately 200,000 pounds per square inch to compress the dust into a core ring of the desired size and shape. As the pressure is applied, due to the lateral forces exerted by the confined permalloy dust and the clearance between the middle portions of the forming sections and the wall of the die base, the middle portions of the forming sections 14 comprising the ring 15 are forced outwardly to increase the curvature of the forming sections. Upon release of the pressure the middle portions of the forming sections, due to the springing of the steel thereof, move inwardly toward the center plug whereby the ends of the forming sections are separated from and relieve the formed permalloy core ring from excess lateral pressure at the joining ends of the forming sections 14 thus to prevent cracking or breakage of the formed core part.

The pressure ring 16 is then removed and the forming sections 14 are slid out of the recess of the die base to permit the removal of the permalloy dust core ring. The forming sections and the center plug are then wiped clean of any dust and reinserted in the base, and the die is then ready to receive another mass of insulated permalloy dust to be pressed into a core ring.

Another embodiment or alternative form of the invention consists of using forming sections ground to fit exactly the contour of the wall 12 of the die base and placing a slip of paper between the tapered wall of the forming sections at each of their ends and the wall 12. With the paper so placed, the applying of pressure to the permalloy dust deposited in the groove 17 causes the forming sections to increase their curvature, whereby upon release of the pressure the sections decrease in curvature and their ends move away from the core part to prevent cracking thereof.

Although the invention as herein described and illustrated is particularly well adapted for use in molding permalloy dust core rings, it will be understood that the invention is capable of many other modifications and applications and is to be limited only by the scope of the appended claims.

What is claimed is:

1. A pressure molding die comprising a base member having walls forming a circular recess, and a plurality of curved sections positioned within the recess and forming a ring to receive the material to be molded, said sections contacting at predetermined points with the walls of said recess and having a lower degree of external curvature than the internal walls of the recess to provide a clearance at other predetermined points enabling the sections when subjected to pressure to flex outwardly at the points of clearance effecting an inward movement at the points of clearance when the pressure is removed to release the material that has been compressed.

2. A molding die comprising a die base having a recess therein, and a plurality of mold sections positioned in the recess, each mold section being so constructed and positioned in the recess that their external walls will contact with the walls of the recess only at predetermined points thereof, providing a clearance between said points to permit the sections to flex under pressure whereby the tendency to form localized stresses upon release of the pressure is minimized.

3. In a molding die, a retaining means, a center member, and sectional means cooperating with the center member to form a recess for receiving the material to be compressed and contacting with the retaining means at the end portions of the sections providing a clearance between the retaining means and the central portion of each section whereby the central portion of each section will move elastically outwardly under pressure.

4. In a molding die, a base having a tapered bore, a removable center plug positioned centrally of the bore, a pressure ring, and forming sections placed about the center plug to provide an annular recess for receiving the material to be molded and contacting with the wall of the tapered bore at their ends to cause them to increase in curvature under pressure and to decrease in curvature when the pressure is released.

5. A molding die, comprising a plurality of curved sections positioned to form a recess for receiving material to be compressed and means externally of the sections for supporting the ends thereof against free outward movement but allowing a compensating outward movement of the central portion of each section whereby the central portion of each section will move elastically outwardly under pressure to minimize localized end stresses set up on release of pressure.

In witness whereof, we hereunto subscribe our names this 6th day of July, A. D. 1929.

RANDALL GILLIS.
JAMES C. MORISON.